(No Model.)

J. LINDLE.
COMBINED WATER COOLER AND FILTER.

No. 320,483. Patented June 23, 1885.

WITNESSES:
C. C. Linthicum.
L. Holmboe.

INVENTOR
Joseph Lindle,
BY Banning & Banning.
ATTORNEYS.

UNITED STATES PATENT OFFICE.

JOSEPH LINDLE, OF CHICAGO, ILLINOIS.

COMBINED WATER COOLER AND FILTER.

SPECIFICATION forming part of Letters Patent No. 320,483, dated June 23, 1885.

Application filed May 21, 1884. (No model.)

*To all whom it may concern:*

Be it known that I, JOSEPH LINDLE, of Chicago, in the county of Cook and State of Illinois, have invented certain new and useful Improvements in Combined Water Coolers and Filters, of which the following is a specification.

My invention, which is an improvement upon the one patented to me April 26, 1881, relates to that class of water-coolers in which the water is conveyed through pipes around ice; and it consists in combining with an ice-chest a cooling pipe or pipes of such form as to obtain the largest amount of cooling-surface with a given length of pipe. My patent above referred to describes a water-cooler and refrigerator having a series of pipes surrounding the ice-chamber. My present improvement consists in making a cooler with a single pipe or pipes of the form hereinafter described, which renders the use of a series of pipes unnecessary.

Figure 1:
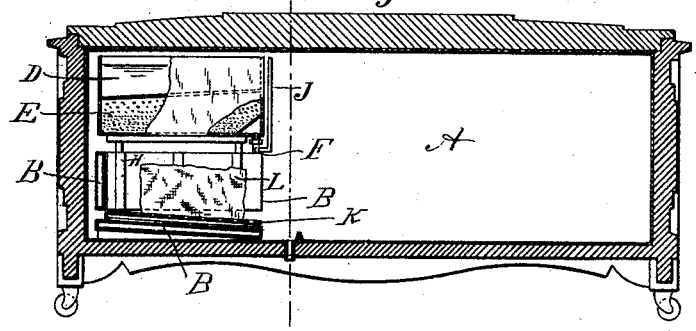
Figure 2:
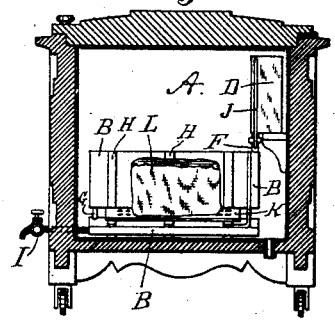
Figure 3:
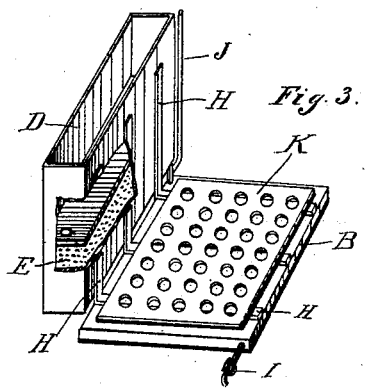
Figure 4:
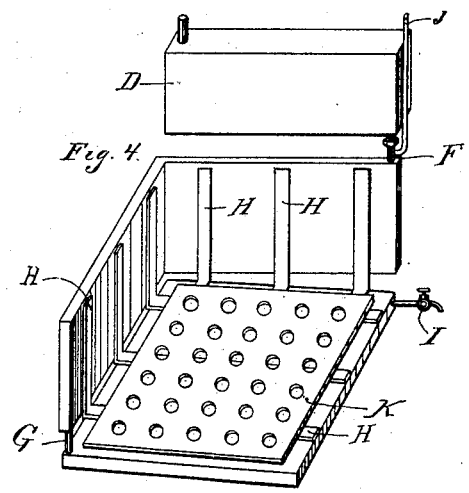
Figure 5:
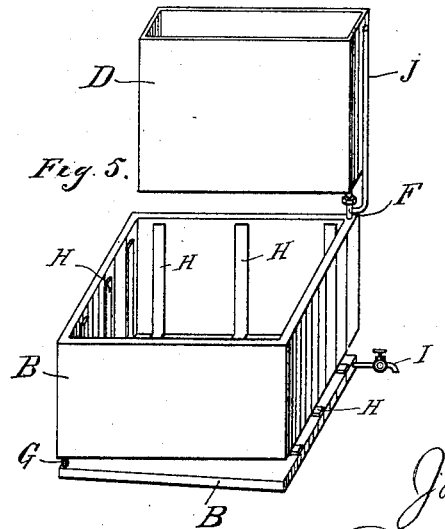

In the accompanying drawings, Figure 1 is a longitudinal vertical section. Fig. 2 is a vertical cross-section on line $x$ $x$ of Fig. 1. Fig. 3 is a perspective view of the water tank and filter, partly in broken section, connected with rectangular water-case under the ice-receptacle; and Figs. 4 and 5 are perspective views of the upper and lower water-tank and lower water-receptacle, and the intervening water pipe or jacket upon two and four sides, respectively, of the ice-space.

My improvements are represented in Figs. 1 and 2 in connection with a refrigerator, A, and the form of cooling-pipe here shown is well adapted to such a combination. This cooling pipe or jacket B is made rectangular in cross-section, and is placed with its broad side next to the ice. It may be placed at the bottom of the ice-chamber, as shown in Fig. 3, or extend around two sides, as shown in Fig. 4, or entirely around the chamber, as shown in Fig. 5, or two of these cooling-pipes may be used, one at the bottom and the other around the sides of the ice-chamber. It is made detachable, is constructed preferably of galvanized iron, and should be of size to correspond with the refrigerator with which it is intended to be used.

The cooling-pipe should be connected with a water-tank, D, and this water-tank may contain filtering material E at the bottom thereof. In Fig. 2 this water-tank is represented as being placed at one side of the ice-chamber and above the cooling-pipe, to which it is connected by a short lead pipe, F. When more than one cooling-pipe is used, as in Figs. 4 and 5, they are connected by a suitable lead pipe, as at G. H represents stay-strips, which are soldered to the floor-pipes and the wall-pipe, when the latter is used, or to the side of the water-tank. These stay-strips are sufficient to maintain the cooling-pipes in position. A faucet, I, located at some convenient point in the cooling-pipe, and extending through the wall of the refrigerator, permits the water to be drawn off for use.

To secure a free and steady flow of water at the faucet, I provide an air-pipe, J, which enters the cooling-pipe B at its upper side, the other end of said pipe being left open.

The ice is placed in a chamber, around the walls or upon the floor of which the cooling-pipes are placed, and preferably in immediate contact with the latter.

A grating, K, may be interposed between the ice L and the stay-strips H.

The form of cooling-pipe here shown presents the largest possible surface to the ice, there being no spaces between the pipes, as is the case where a series of pipes is used; and it also has the advantage over a series of smaller pipes that it can be more cheaply manufactured and be more readily applied to many kinds of ice-chests now in common use.

I claim—

1. The combination, with the water-reservoir, of the single broad flat pipe or cooling-jacket B, detached from the surrounding walls and partly or wholly inclosing the sides of the ice, and connected by a pipe with a similar flat section thereof extending under the ice, substantially as shown.

2. In a refrigerator, the single broad flat pipe or ice-inclosing jacket B, disconnected from the outer walls and connected with the filtering-tank above and with the flat water-box extending under the ice space, substantially as set forth.

JOSEPH LINDLE.

Witnesses:
EPHRAIM BANNING,
C. C. LINTHICUM.